US008803371B2

(12) United States Patent
Trammell et al.

(10) Patent No.: US 8,803,371 B2
(45) Date of Patent: *Aug. 12, 2014

(54) SECONDARY FOR LINEAR DRIVE MOTOR COMPRISING SHEET OF HIGHLY PERMEABLE MAGNETIC MATERIAL HAVING SYNCHRONIZED MOTOR TEETH, ENCODER TEETH, AND COMMUTATION TRACKS INTEGRALLY FORMED THEREIN (75) Inventors: Glenn S. Trammell, Fort Smith, AR (US); Rui Qiao, Fort Smith, AR (US)

(73) Assignee: Baldor Electric Company, Fort Smith, AR (US)

( * ) Notice: Subject to any disclaimer, the term of this patent is extended or adjusted under 35 U.S.C. 154(b) by 334 days.

This patent is subject to a terminal disclaimer.

(21) Appl. No.: 13/179,959

(22) Filed: Jul. 11, 2011

(65) Prior Publication Data

US 2013/0015724 A1    Jan. 17, 2013

(51) Int. Cl.
*H02K 41/03* (2006.01)
*H02K 41/02* (2006.01)

(52) U.S. Cl.
USPC ............. 310/12.19; 310/12.18; 310/68 B; 33/706; 33/707; 33/708

(58) Field of Classification Search
USPC ........................................... 33/706, 707, 708
IPC ............................................. H02K 41/02,41/03
See application file for complete search history.

(56) References Cited

U.S. PATENT DOCUMENTS

| | | |
|---|---|---|
| RE27,436 E | 7/1972 | Sawyer |
| 3,851,196 A | 11/1974 | Hinds |
| 3,950,663 A | 4/1976 | Mead |
| 4,078,192 A | 3/1978 | Fultz |
| 4,315,171 A | 2/1982 | Schaeffer |
| 4,335,338 A | 6/1982 | Sawyer |
| 4,404,509 A | 9/1983 | Hartwig |
| 4,509,001 A | 4/1985 | Wakabayashi et al. |
| 4,661,730 A | 4/1987 | Maruyama et al. |
| 4,725,750 A | 2/1988 | Welch |
| 4,749,921 A | 6/1988 | Chitayat |
| 4,757,220 A | 7/1988 | Pouillange |

(Continued)

OTHER PUBLICATIONS

International Search Report and Written Opinion for PCT/US2012/046004 dated Mar. 26, 2013.

(Continued)

*Primary Examiner* — Quyen Leung
*Assistant Examiner* — Michael Andrews
(74) *Attorney, Agent, or Firm* — Thompson Coburn LLP (57) ABSTRACT

A secondary for a motor, for instance a linear drive motor, has a sheet of highly magnetic permeable material with a plurality of slots extending through the sheet spaced along a length of the sheet. The slots define a plurality of teeth in the sheet and enable the sheet to be conformable to a mounting surface when forming the secondary of the motor. The top surface of the sheet has a plurality of pockets formed adjacent the plurality of slots. The pockets extend parallel to the width and are spaced along the length of the sheet. The pockets form a sensor operatively connected to a control of the motor. The sensor may be an encoder, and/or the sensor may be operatively connected to a control for controlling commutation of the motor, and/or setting positional limits and/or "home(s)" for the motor, providing absolute positional information and/or providing information about the sheet, for instance, the identity of one platen among many.

37 Claims, 9 Drawing Sheets

(56) References Cited

U.S. PATENT DOCUMENTS

| | | | |
|---|---|---|---|
| 4,887,914 A | 12/1989 | Lin et al. | |
| 4,912,746 A | 3/1990 | Oishi | |
| 4,922,143 A * | 5/1990 | Gosdowski et al. | 310/12.27 |
| 4,972,108 A | 11/1990 | Venturini | |
| 5,023,495 A * | 6/1991 | Ohsaka et al. | 310/12.19 |
| 5,334,892 A | 8/1994 | Chitayat | |
| 5,601,681 A | 2/1997 | Bayro | |
| 5,642,013 A | 6/1997 | Wavre | |
| 5,723,917 A | 3/1998 | Chitayat | |
| 5,841,207 A | 11/1998 | Correns et al. | |
| 5,910,691 A | 6/1999 | Wavre | |
| 5,965,962 A | 10/1999 | Hinds | |
| 6,160,327 A | 12/2000 | Wang | |
| 6,215,260 B1 | 4/2001 | Hinds | |
| 6,242,822 B1 | 6/2001 | Strothmann et al. | |
| 6,522,035 B1 | 2/2003 | Smit | |
| 6,798,089 B1 | 9/2004 | Smit | |
| 6,954,009 B2 | 10/2005 | Nakamura et al. | |
| 7,133,115 B2 | 11/2006 | Nawata et al. | |
| 7,230,355 B2 | 6/2007 | Lin et al. | |
| 7,566,997 B2 | 7/2009 | Trammell | |
| 7,934,307 B2 | 5/2011 | Trammell | |
| 8,418,350 B2 * | 4/2013 | Trammell et al. | 310/43 |
| 2004/0263000 A1 | 12/2004 | Vreugdewater et al. | |
| 2005/0211920 A1 | 9/2005 | Shibata | |
| 2013/0015725 A1 | 1/2013 | Trammell | |
| 2013/0015726 A1 | 1/2013 | Trammell | |

OTHER PUBLICATIONS

Patent Abstract, JP Publication No. 57-135666, published Aug. 21, 1982, Figures 1, 2.

Patent Abstract, JP Publication No. 57-151260, published Sep. 18, 1982, Figure 1.

Patent Abstract, JP Publication No. 57-168986, published Oct. 25, 1982, Figures 1, 2.

Patent Abstract, JP Publication No. 61-251467, published Nov. 8, 1986, Figures 1, 2.

Patent Abstract, JP Publication No. 56-068263, published Jun. 8, 1981.

Office Action for U.S. Appl. No. 13/180,017, filed Oct. 17, 2012.

\* cited by examiner

SECONDARY FOR LINEAR DRIVE MOTOR COMPRISING SHEET OF HIGHLY PERMEABLE MAGNETIC MATERIAL HAVING SYNCHRONIZED MOTOR TEETH, ENCODER TEETH, AND COMMUTATION TRACKS INTEGRALLY FORMED THEREIN

BACKGROUND

This disclosure relates to linear drive motors, including synchronous linear drive motors. More particularly, the disclosure relates to secondaries for such motors, including stationary and moving secondaries, and further including secondaries with and without magnets. In one aspect, as will be described in more detail below, a thin sheet of magnetic permeable material is formed with slots extending through the material to form teeth of the secondary and the sheet may also have pockets or recesses formed simultaneously with the motor teeth to eliminate manufacturing or alignment variances. Some of the pockets or recesses may form teeth to be used as part of an encoder scale for the motor and other of the pockets or recesses may be used as part of one or more sensors to provide positioning information for the motor, as well as sensors for the drive components regulating commutation of the motor, i.e., commutation teeth. In another aspect, the pockets used to provide the encoder and commutation functions may be aligned with small magnets installed in the secondary which are seen by the encoder as "home" positions or limits. Yet in another aspect, pockets or recesses are added in the sheet and synchronized with the commutation and encoder teeth to provide "absolute position" on a given platen secondary, thereby enabling the drive for the motor to be flexibly programmed, and the identifying of specific platen secondaries when many are strung together in a line and the providing of "absolute position" for the entire string. Thus, the concepts described herein provide for simultaneous formation (and synchronization) of the motor teeth with the encoder teeth and/or commutation teeth as well as other drive system components. A sheet formed in such a way to form a secondary eliminates the need of conventional "Hall Effect" devices and inherently minimizes problems with establishing or maintaining motor commutation, for instance, motor commutation in sinusoidally commutated linear motors with platens having separate encoder scales that were attached after the teeth in the platen were created. As sheet formed in the way described herein reduces variation, thereby enabling the "electrical angle or commutation angle offset" of a motor to be standardized which in turn reduces set-up and calibration times while providing increased flexibility. Moreover, a drive may electrically couple a primary to a secondary in a string of secondaries and continues with the same commutation pattern between the motor and encoder teeth used in the previous secondary without needing to re-establish phasing in the next secondary. Motion is not slowed down or stopped to perform a "phase search" or read a "Hall Effect" sensor.

DETAILED DESCRIPTION

Figure 26:
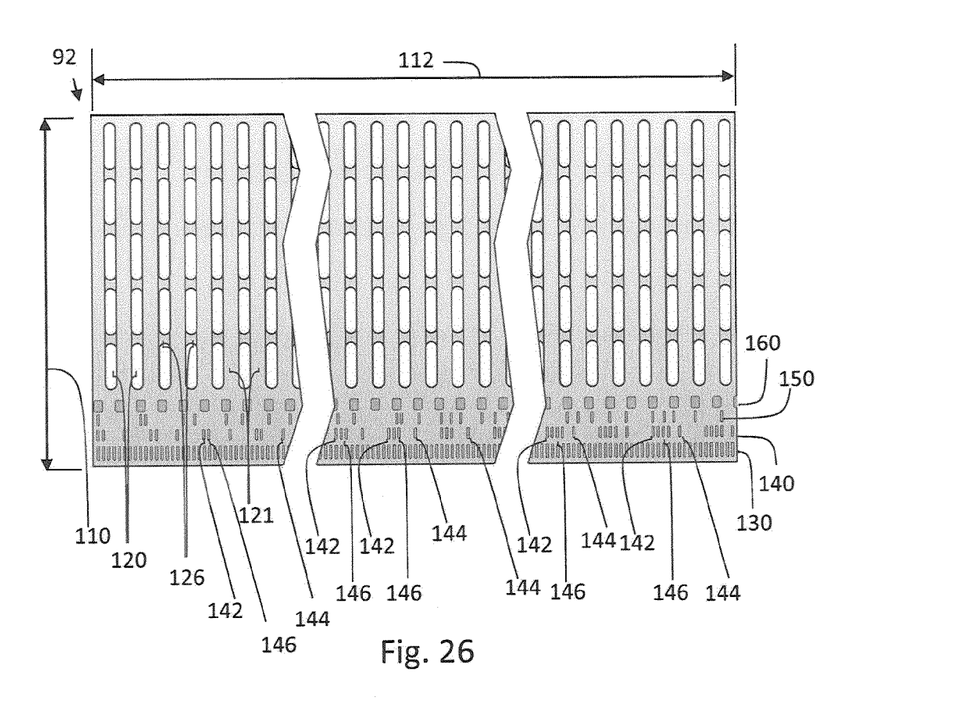
FIG. 26 is a plan view of an alternate embodiment of a sheet of a platen segment comprising a motor teeth etched through the sheet, with encoder teeth comprising partially etched pockets in the sheet synchronized with the motor teeth, commutation teeth comprising partially etched pockets in the sheet synchronized with the motor teeth, a track with additional reference markers comprising partially etched pockets in the sheet synchronized with the motor teeth, and partially etched pockets comprising magnet locators in the sheet synchronized with the motor teeth.
Figure 27:
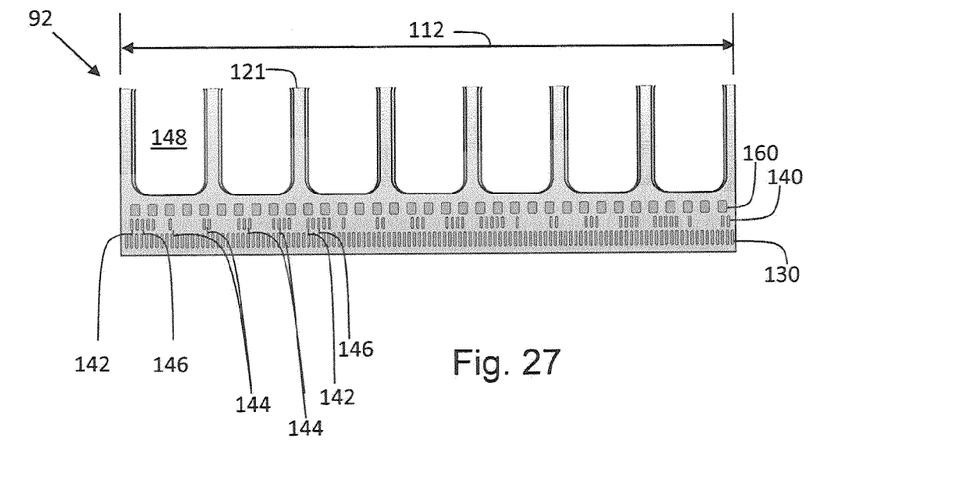
FIG. 27 is an enlarged plan view of an alternate embodiment of a platen comprising slots etched through the sheet to hold motor magnets of a secondary, with encoder teeth comprising partially etched pockets in the sheet synchronized with the secondary magnet slots, commutation teeth comprising partially etched pockets in the sheet synchronized with the motor teeth with additional reference markers, and partially etched pockets comprising magnet locators in the sheet synchronized with the motor teeth.
Figure 32:
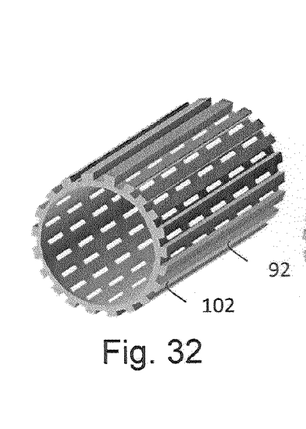
FIG. 32 is an alternate embodiment of a rotary motor with a single sheet spot welded to form a rotary motor primary.
Figures 33, 34:
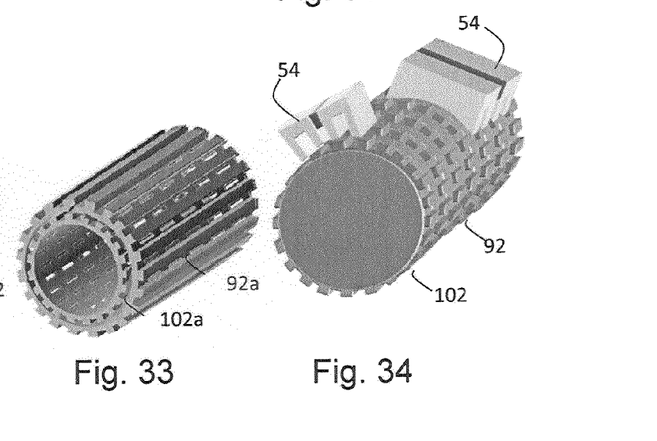
FIG. 33 is an alternate embodiment of two sheets formed in a tubular shape and concentrically disposed about each other to form a rotary motor primary.
FIG. 34 is an alternate embodiment of a rotary or limited or unlimited torque motor with an integrated vertical "z"-axis motor with motor stacks arranged orthogonally to create multi-axis capability.

Although the description is in reference to a linear drive motor as shown in FIGS. 1-26 and 28-29, the principles described herein may be used in connection with a rotary motor as shown in FIGS. 32-34, or permanent magnet linear motor with magnets in the secondary like an iron core motor or even a cog-free, for instance, as shown in FIG. 27. Additionally, although the description is in relation to a linear drive motor where the primary moves and the secondary is stationary, the principles described herein may be used in connection with a stationary primary and a moving secondary, for instance, in a CNC conveyor system that moves and sorts items sitting on or fixtured to one or more platen segments, or positions items in a precise way, for instance, in automated assembly, machining or manufacture. Therefore, the description should not be viewed in any limiting way. For purposes of illustration, a linear drive motor with a moving primary and a stationary secondary will be described.

Motor Primary

Figure 28:
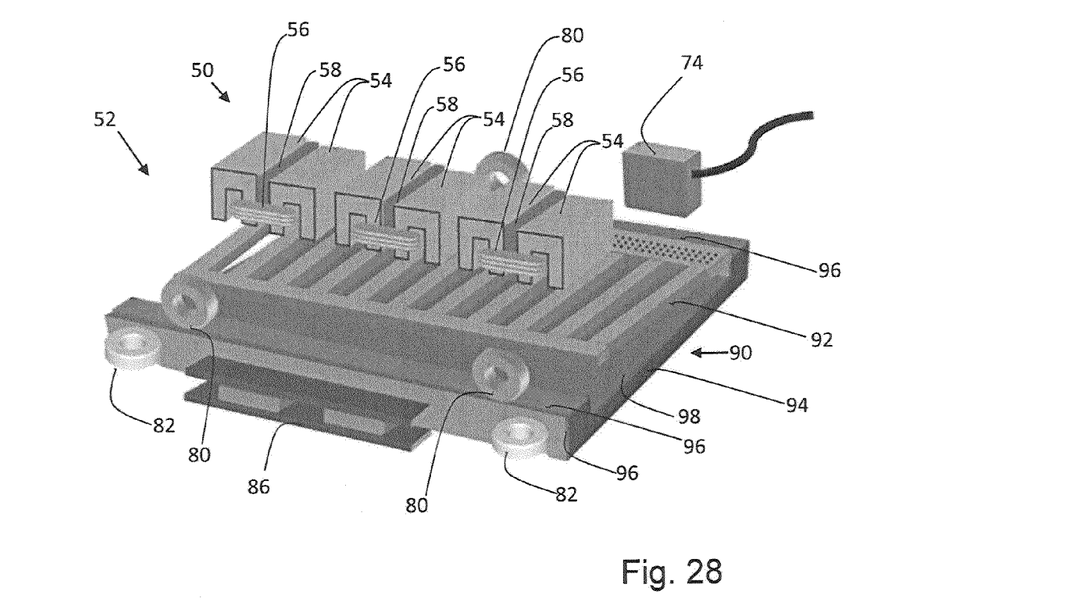
FIG. 28 is an exploded perspective view of a single axis linear drive motor with a housing enclosure not shown but showing a primary comprising three motor stacks, a secondary comprising a sheet formed in the manner shown by any of the sets of figures above, a secondary support base for the sheet with integrated bearing rails, an encoder, a side magnetic preload; and a top and side bearing system for primary and a bearing system for the primary.
Figure 29:
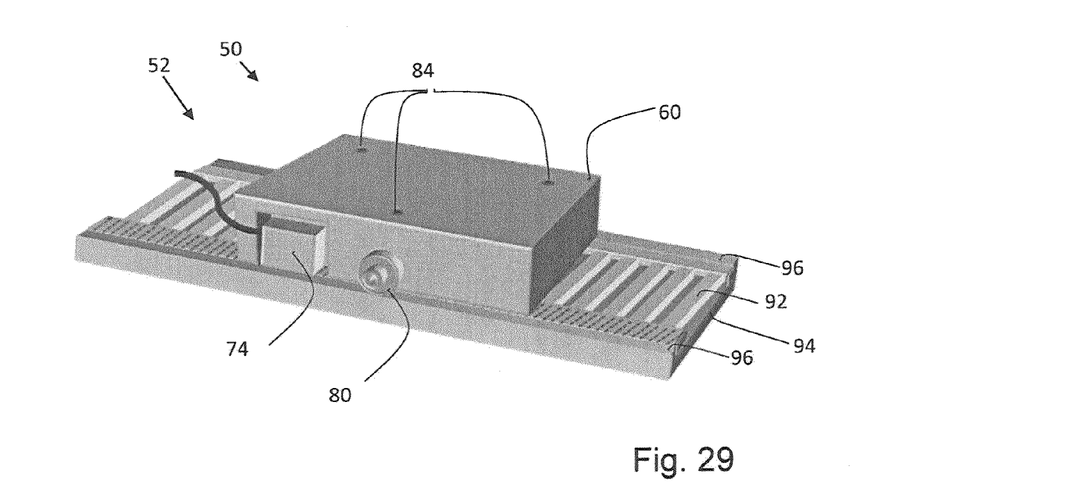
FIG. 29 shows the single axis linear drive motor of FIG. 28 with components assembled into a housing from a perspective view opposite that of FIG. 28.

As best shown in FIG. 28, the linear drive motor 50 comprises a moving primary carriage 52 with solid steel stacks 54 containing coils 56 and magnets 58. The stack may be made from either a laminated or sold steel core and arranged with a magnet and coil. The solid steel stacks are preferred in that they are much simpler in design and they may be machined from a single piece of steel rather than from laminations that are stamped, stacked and bonded together. Also, the solid steel stacks provide their own integral support without having to add intermediate supports. The moving primary carriage 52 may also comprise a machined housing 60 that holds the solid steel stacks, coils and magnets. The housing may also be an extruded piece. FIG. 28 shows the exploded view of the motor primary without a housing and FIG. 29 shows the linear motor with the housing 60 enclosing the primary carriage components. The solid steel stacks 54 with magnets may be mounted in a cavity and self-align with mounting holes in the moving primary carriage housing. The coils 56 may then be placed into the stacks and the same housing 60 may be used as a mold for encapsulating the parts with epoxy. Because epoxy is not needed for structural support in the stacks, a more suitable non-structural epoxy or another material may be selected, for example, one which has better thermal conductivity, produces less "outgassing" and thus meets cleanroom requirements, or is better suited in a high vacuum operation.

Figure 30:
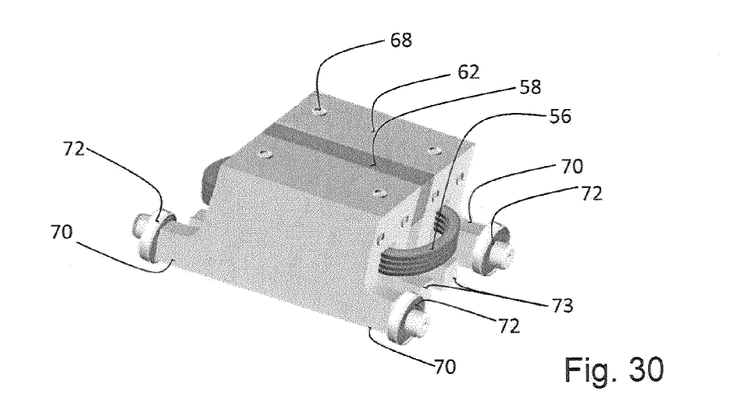
FIG. 30 shows a motor stack that may be used with a secondary comprising a sheet formed in the manner shown by any of the sets of figures above; and a bearing system therefor.
Figure 31:
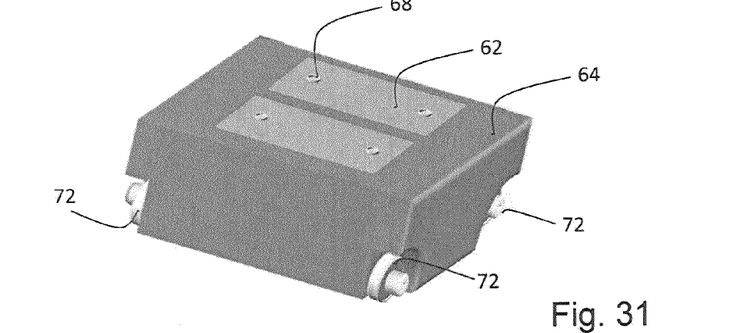
FIG. 31 shows the housingless motor of FIG. 30 with epoxy coating.

As an alternative, a stack 62 as shown in FIG. 30 may be encapsulated with epoxy 64 as shown in FIG. 31 to form the primary without a housing (i.e., housing-less). The epoxy fills the teeth and covers the stacks 62 and coils 56 for electrical insulation, mechanical protection, aesthetic, or safety reasons. The customer may mount fixtures or tooling directly to the solid steel stack. External surfaces on the stacks may be configured with mounting holes 68 for mounting components as necessary based upon the end user application, including mounting a customer's payload directly to the stack. The stacks may also be configured to support the encoder and bearings. As shown in FIG. 30, the stack has projections 70 and roller bearings 72 may be directly mounted to the stack projections. The stack has additional projections and contours 73 to protect or hide end turns of the coils 56 under the motor teeth and reduce potential impingement from the bearings or alternately to provide greater tooth area which is oftentimes sacrificed in the design of some motors.

A linear encoder read head 74 (FIGS. 28,29) may be attached directly to the motor carriage. The linear encoder read head 74 is part of the linear encoder system that provides position feedback to the drive or controller of the motor. The linear encoder read head 74 reads an encoder scale provided on the secondary, as described below in greater detail, and eliminates the Hall Effect sensors that often are provided on the housing to establish motor commutation. The encoder read head may be disposed in a mounting pocket adjacent a stack. By machining the mounting pocket for the encoder read head along with mounting holes for the stacks together, a fixed relationship between the motor stacks 54 and encoder read head 74 may be accurately established and repeated during the manufacturing process. This fixes the "electrical or commutation angle offset" for the primary thereby facilitating set up and interchanging component parts.

The primary carriage 52 may also have an arrangement of bearings 80 that may comprise relative simple and inexpensive roller bearing assemblies (about 3 or 4) which can handle the high magnetic preloads between the primary and secondary. The roller bearings 80 may be configured for rolling contact with hardened wear surfaces of the support plate. The roller bearings 80 may be mounted to the housing 60 using conventional means and may replace expensive bearing blocks and precision machined spacers often found in some linear drive motors. The roller bearings 80 may be mounted into the housing using shoulder screws with square nuts on the end of the screw which fit into slots on the housing to hold the bearing in place. Jack screws may be used to adjust the position of the shoulder screw in the slot to achieve the desired motor air gap. The bearings may be mounted to a solid steel stack in a similar way by machining a recess or pocket in the stack under the magnet to accommodate the square nut for sliding motion therein, and a shoulder screw may be used to mount the bearing. The bearing may also be mounted directly to the solid steel stack. Side guide bearings 82 may also be mounted to the housing (or stack) in a similar way. Holes 84 in the housing (or the stack) may be provided for access to the jack screws. A magnetic preload assembly 86 may be provided to hold the motor against the side of the platen. The magnetic preload assembly 86 may be formed from a permanent magnet disposed between two steel plates as shown in FIG. 28.

Sheet Description

The linear drive motor stationary secondary 90 comprises a sheet 92 of a highly magnetic permeable material, preferably with a high iron content and low carbon content. The sheet may be fixed to a support structure 94 to form a platen segment for the secondary. The support structure 94 may comprise a relatively thicker plate with a pocket that receives the sheet, for instance, as shown in FIG. 28. The material forming the support structure 94 may be a high carbon steel or other hardened steel for strength and wear resistance while the sheet 92 insert is made from a relatively soft yet highly magnetically permeable material. The support structure 94 may have three precision ground and hardened bearing surfaces 96 which are typically two on the top surface and one guide surface on one side of the platen for the roller bearings 80 and side guide bearings 82 associated with the primary carriage. Thus, the support structure 94 may provide overall support for the platen segment, and bearing support for high magnetic preloads and customer loads, and guidance. A very thin hardened or tempered steel plate (not shown) may be disposed between the support base and the sheet to provide a wear resistant surface for the roller bearings to contact. The wear strip may be easily replaced when worn as necessary. Although the sheet is shown in the drawings as being insertable into a cavity 98 of a support structure to form a rigid and flat base for the secondary, the sheet may be mounted to a flat surface. The sheet 92 may be secured, or mounted to a support structure 94, with screws, spot welds, or adhesive.

Figures 35, 36:
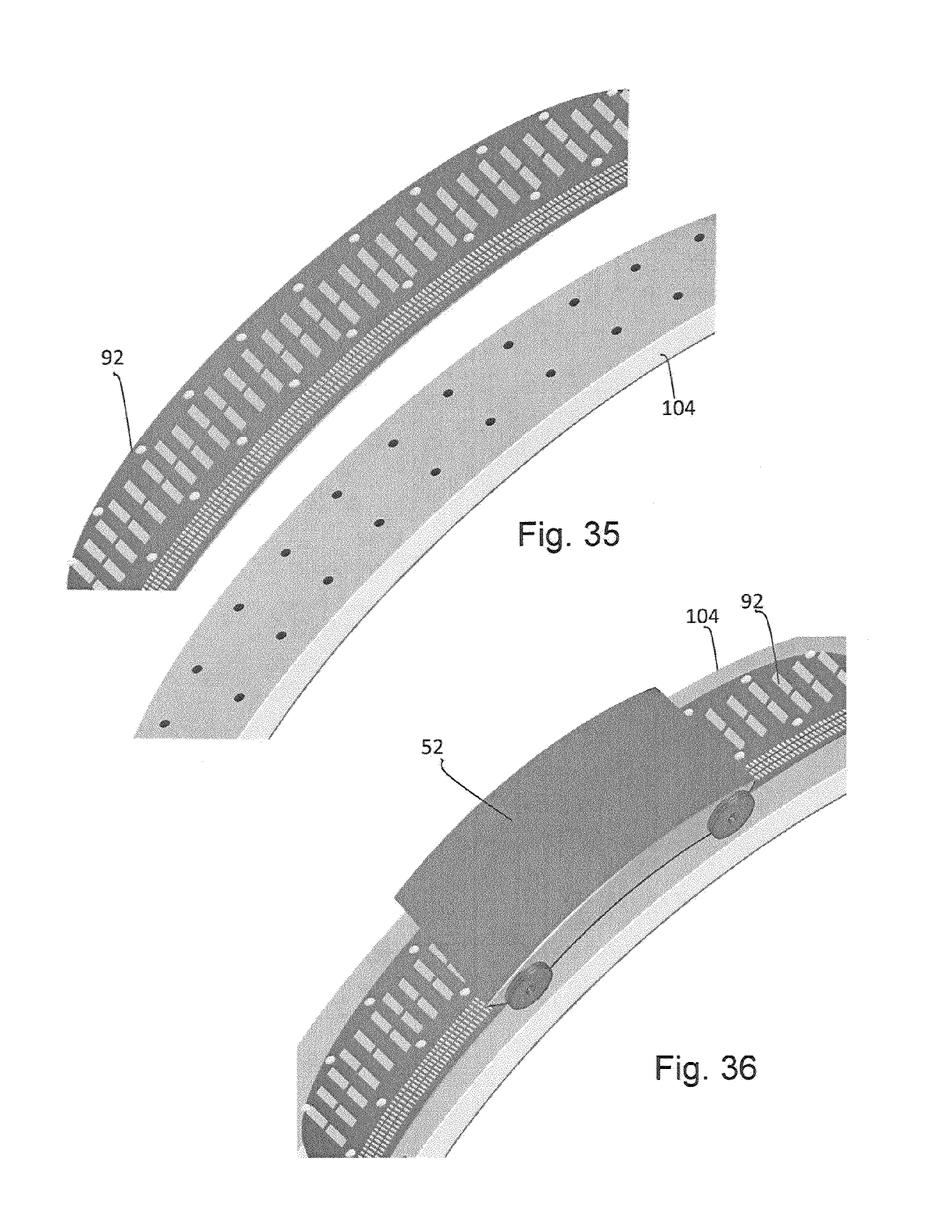
FIG. 35 is an exploded perspective view of an exemplary platen segment and curved support structure.
FIG. 36 is a perspective view of the platen segment and curved support structure of FIG. 35 assembled with an arcuate motor operatively coupled thereto for translation along the secondary.

Additionally, a thin sheet 92 may be formed into a tube 102 as shown in FIGS. 32 and 34, or two sheets 92a may be wrapped into concentrically disposed tubes to form layers 102a to form a rotor of a rotary permanent magnet servo motor as shown in FIG. 33. Opposite side edges of the sheet may be attached together form the tubular shape. A thin sheet 92 may also be mounted to the curved support 104 and conform to the curved support as shown in FIGS. 35-36. Accordingly, the principles described herein may be used in connection with rotary servo motor and gear applications that require linear or rotary motion.

Referring to FIGS. 1-27, the sheet 92 preferably has a width 110 and a length 112, although both sides may be the same dimension, and a first surface 114 and an opposite second surface 116 with a thickness 118 extending therebetween. The sheet thickness may be 0.060 inches to 0.100 inches. A sheet may have a thickness of about 2 mm or (0.0787 inches). More highly magnetically permeable materials are readily available in these thinner thicknesses. The sheet 92 has a plurality of slots 120 in the first and second surfaces and at least partially extending through the sheet thickness parallel to the width 110 of the sheet and spaced along the length 112 of the sheet. The slots define a plurality of teeth 121 in the sheet between the slots and enable the sheet to be conformable to the mounting surface to which the sheet is mounted when forming the secondary of the motor. The slots/teeth may have a spacing defining a motor pitch.

Mounting holes 122 in the sheet may be added for mounting the sheet to the base. Guide holes 124 may be provided in the sheet depending upon the end user's application and requirement for external mounting of fixtures and tooling. The guide holes 124 (and/or mounting holes 122) may be synchronized with the features of the sheet described herein (i.e., "Track 3" for absolute positioning disclosed below) to establish a common "zero position" among motor secondaries. Additionally, after the sheet is mounted to a support structure or base plate, the guide holes 124 may provide references for customer use, for instance, precision drilled holes for reaming and installation of dowel pins or for tapped holes used in the end-user application.

Referring to FIGS. 1-26, the sheet may have a plurality of bridges 126 formed in the slots between the teeth thereby operatively connecting the teeth 121 together. This ensures the spacing of motor teeth 121 is relatively constant but yet allows the sheet to be handled in the manufacturing process without deforming the teeth and also to be conformable to the surface to which it is mounted. The bridges 126 between the motor teeth 121 assist in keeping the teeth in a proper spatial relationship when the sheet conforms to a curved support structure. The bridges 126 may form recesses in at least one of the first and second surfaces 114,116. Preferably, the bridges are about 25% of the sheet thickness, although the bridges may be the entire thickness of the sheet. The bridges 126 may also be generally flush with either of the first and second surfaces as may be desired. Making the bridges flush with the second surface reduces the effect of interference of the flux pattern between the primary and secondary caused by the bridges. Adjusting the thickness and the position of the bridge (i.e., flush or recessed from either the first of second side) allows the relative pliability of the sheet to be changed as desired.

As shown in FIGS. 11-25, the sheet may include laminations 92a stacked together to form the sheet. Each lamination may have a slot arrangement as described above so that when the laminations are stacked, they form a contiguous secondary. This allows the tooth height to be extended and the tooth cross section to be selected for optimum conditions. Thus, the laminations in the stack may be geometrically different and selectively stacked to form a desired cross sectional geometry of the teeth of the sheet. As an example in FIGS. 12, 17, and 22, the sheet comprises two laminations of about 2 mm (0.0787 inches) that are stacked to form a 4 mm thick sheet for the platen. Accordingly, the tooth height has been doubled which is desired when the motor pitch is doubled. This increases force with the larger tooth and produces greater velocities that may be developed in the motor, especially in a large pitch motor. For larger pitch motors, laminations may be stacked as desired to provide a desired tooth size. When stacking multiple laminations, the bridges may be formed narrower to reduce interference with the magnetic path between the motor and secondary teeth. By way of illustration and not in any limiting sense, the secondaries shown in FIGS. 11, 16, and 21 have a 10 mm motor tooth pitch.

Figure 15:
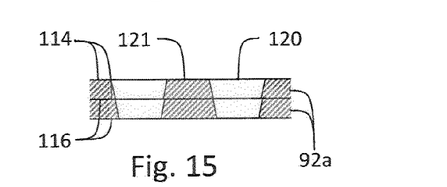
FIG. 15 is an enlarged cross-section view taken from detail area 15-15 of FIG. 12.
Figures 16, 17, 19:
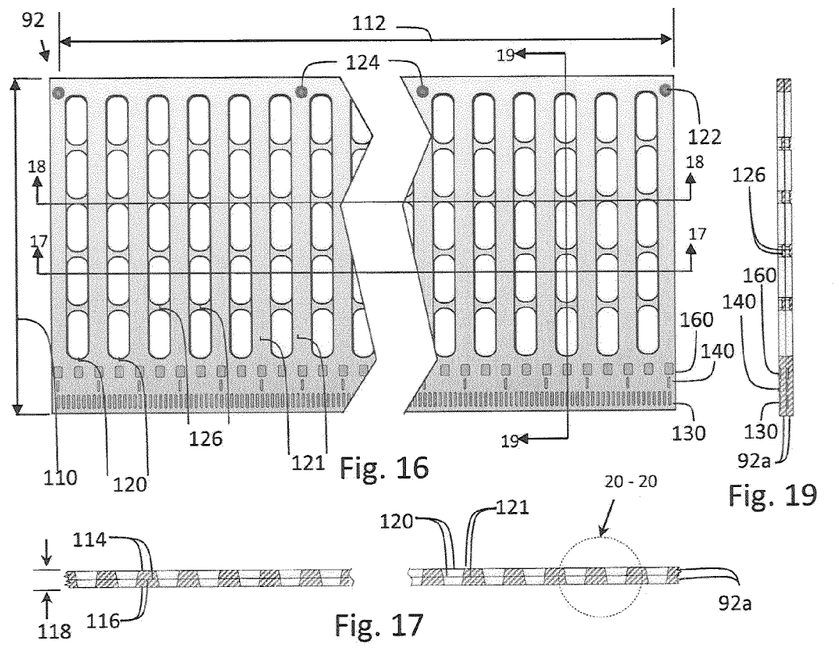
FIG. 16 is a plan view of another embodiment of a sheet for a platen segment comprising stacked laminations with motor teeth etched through each of the laminations, with encoder teeth comprising partially etched pockets serving as reference marks or teeth in the top lamination synchronized with the motor teeth, commutation teeth comprising partially etched pockets in the top lamination synchronized with the motor teeth, and magnet locators comprising partially etched pockets used as homes, limits or reference marks for drive functions in the top lamination which are synchronized with the motor and commutation teeth.
FIG. 17 is a cross sectional view of the sheet taken along lines 17-17 of FIG. 16.
FIG. 19 is a cross sectional view of the sheet taken along lines 19-19 of FIG. 16.
Figure 18:
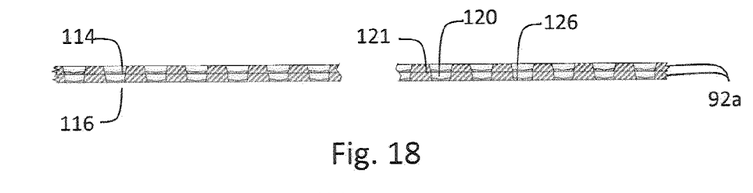
FIG. 18 is a cross sectional view of the sheet taken along lines 18-18 of FIG. 16.
Figure 20:
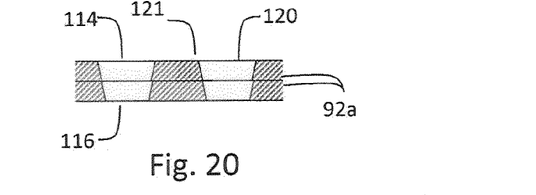
FIG. 20 is an enlarged cross-section view taken from detail area 20-20 of FIG. 16.
Figure 25:
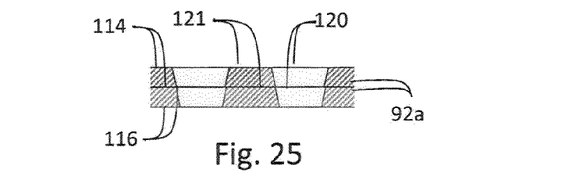
FIG. 25 is an enlarged cross-section view taken from detail area 25-25 of FIG. 22.

The slots in the sheet may be formed in such a way that the motor teeth have a cross section other than rectilinear. For instance, it has been found that a trapezoidal tooth has advantageous magnetic properties in a linear motor to produce more force. Accordingly, the width of the slot 120 on the top side 114 of the sheet may be greater than the slot width at the bottom side 116 of the sheet. FIGS. 5, 10, 15, 20, and 25 show such an arrangement. Each of the laminations may be formed accordingly so that when they are stacked to form the sheet, the desired shape is achieved. FIGS. 15, 20, and 25 show such an arrangement where each of the laminations of the sheet has teeth with a cross section such that when stacked to form the sheet, the teeth have a composite trapezoidal cross-section. Other geometries are also possible. For instance, a lamination may be formed with teeth or surface features on the inner layer as shown in FIG. 33 having an aerodynamic shape to act like a cooling fan to draw air directly through the motor.

Adjacent the motor teeth 121, a plurality of pockets or recesses may be provided in the top surface of the sheet to form one or more sensors for drive components of the motor. The pockets or recesses may be formed as teeth, for instance, for an encoder and/or for a sensor generating commutation signals for the drive of the motor. The pockets or recesses may also be formed to hold magnets or other devices used in sensors for positioning functions associated with the drive of the motor. It is not necessary that each sheet have encoder teeth or commutation teeth or pockets comprising sensors for positioning or for identifying platen segments. A sheet as described herein may include any one or number of features depending upon the application. Preferably, the pocket or recesses are formed in the same manufacturing set-up to reduce variation. The top surface plurality of pockets and recesses may be formed adjacent the plurality of slots forming the motor, and extend parallel to the width of the sheet and spaced along the length of the sheet.

Preferably, the slots in the sheet (or the individual laminations) comprising the motor teeth, and the plurality of pockets and recesses comprising the teeth and pockets used for the encoder, commutation, and/or positioning functions, are formed through a photo-chemical etching process. The pockets, for instance, forming the encoder track and/or the commutation track, may be formed by a "partial one sided etching" or "step or blind hole etching". This process has proven satisfactory for creating small precise features. As an example, the encoder and commutation track have teeth that are etched to a depth of approximately 0.25 mm. Preferably, each sheet forming a platen segment may have its features dimensionally identical to another sheet, so that when multiple platen segments are arranged together, each platen segment will have the same electrical or commutation angle offset thereby facilitating set-up and interchanging component parts.

For forming the slots in the sheet (or the individual laminations) comprising the motor teeth, "a single sided through etch" or "double sided through etching" may be employed to create the slots in the laminations, although a "double sided through etch" process is preferred. When photo chemical etching is from only one side there are inherent limits to the size, depth, shape and quality of the features. The "double sided etch" process etches the same feature in both sides of the sheet (or lamination) at the same time. Double sided etching minimizes problems from "over-etching," creates more accurate and more repeatable features, and allows different patterns to be etched on each side of the sheet (or lamination). For instance, "double sided etching" allows forming a tooth that is wider on the bottom than on the top. The effect is to create a "trapezoidal" shaped tooth which has better magnetic flux properties. For instance, in a trapezoidal tooth shape, the tooth bottom is larger which allows for improved overall flux flow and the top of the tooth is optimized for the motor primary or for properly saturating of the tooth surface. A two sided photochemical etching process facilitates this process where one slot can be made larger than the other leaving an approximate trapezoidal tooth shape. As discussed above, this results in motor teeth that are narrower on the top side 114 of the sheet and wider on the bottom side 116 of the sheet. Preferably, a combination of "partial one sided etching" and "double sided etching" is used to form the slots/teeth in the sheet and the encoder track, commutation track and/or other tracks and features in one step-up, thereby allowing the etched pockets and recesses to align to the motor teeth as necessary to allow an accurate and repeatable system. Proper implementation of the commutation track and other tracks as described herein requires that the relationship between features and the motor teeth be very repeatable over each pole pitch. Thus, a "combination etch" combines the "double etch" process, which forms large motor teeth, with a "partial etching" process, which forms the smaller critical features, i.e., pockets for the encoder and other sensor functions. The "combination etch" lowers the cost to manufacture the secondary and synchronizes the motor teeth with the encoder and other sensor pockets. The recessed bridge features may also be formed through a "combination etch" process where the slots forming the motor teeth are etched from the top and bottom while the areas on either side of the bridges are etched from the bottom. Other methods of forming the sheet with the features described herein may also be used, including EDM or conventional machining.

Encoder Track

Figures 1, 2, 4:
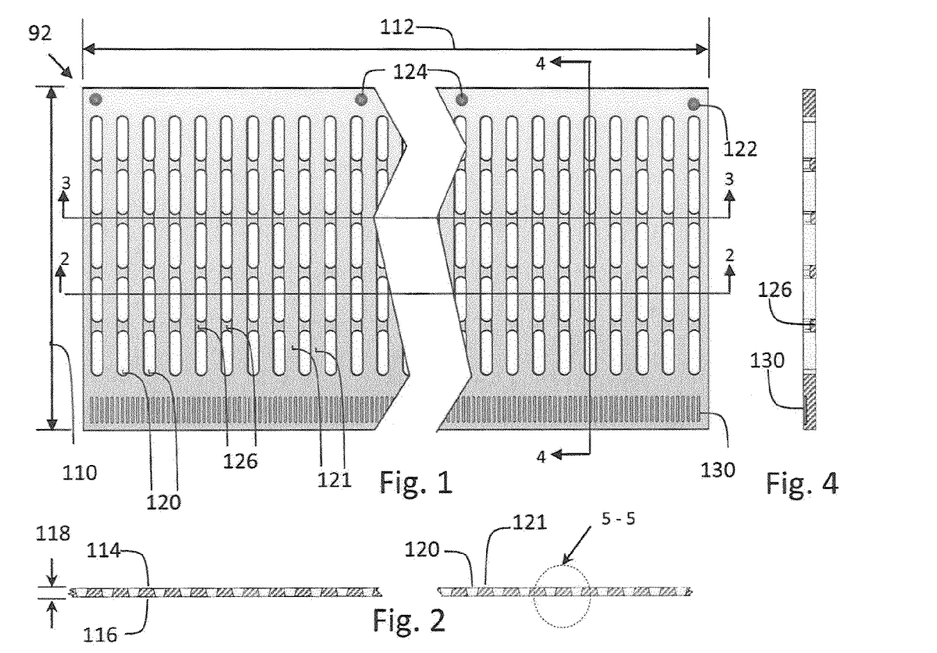
FIG. 1 is a plan view of one embodiment of a sheet for a platen segment comprising motor teeth etched through the sheet and encoder teeth comprising partially etched pockets or teeth synchronized with the motor teeth.
FIG. 2 is a cross sectional view of the sheet taken along lines 2-2 of FIG. 1.
FIG. 4 is a cross sectional view of the sheet taken along lines 4-4 of FIG. 1.
Figure 3:
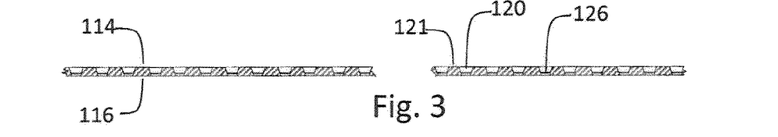
FIG. 3 is a cross sectional view of the sheet taken along lines 3-3 of FIG. 1.
Figure 5:
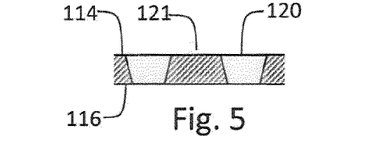
FIG. 5 is an enlarged cross-section view taken from detail area 5-5 of FIG. 2.
Figures 6, 9:
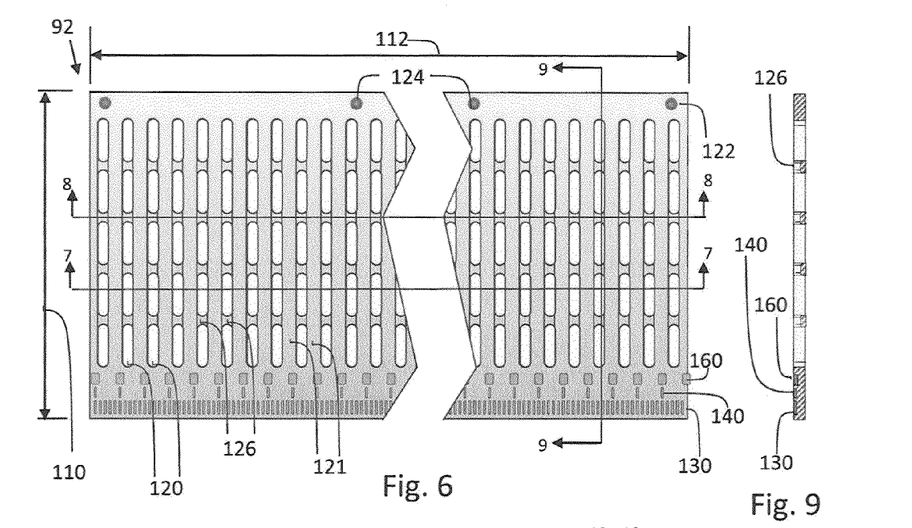
FIG. 6 is a plan view of another embodiment of a sheet for a platen segment comprising motor teeth etched through the sheet, encoder teeth comprising partially etched pockets synchronized with the motor teeth, commutation teeth comprising partially etched pockets synchronized with the motor teeth, and magnet locators comprising partially etched pockets synchronized with the motor teeth and used as homes, limits or reference marks for drive functions.
FIG. 9 is a cross sectional view of the sheet taken along lines 9-9 of FIG. 6.
Figure 7:
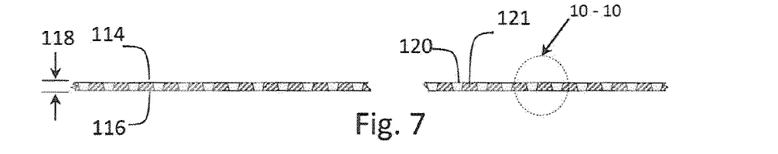
FIG. 7 is a cross sectional view of the sheet taken along lines 7-7 of FIG. 6.
Figure 8:
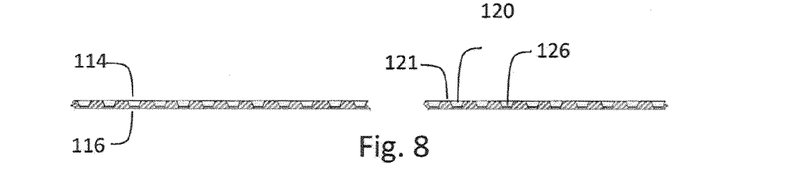
FIG. 8 is a cross sectional view of the sheet taken along lines 8-8 of FIG. 6.
Figure 10:
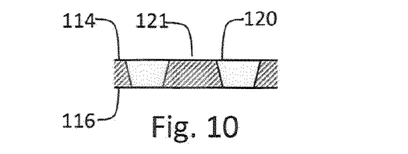
FIG. 10 is an enlarged cross-section view taken from detail area 10-10 of FIG. 6.
Figure 11:
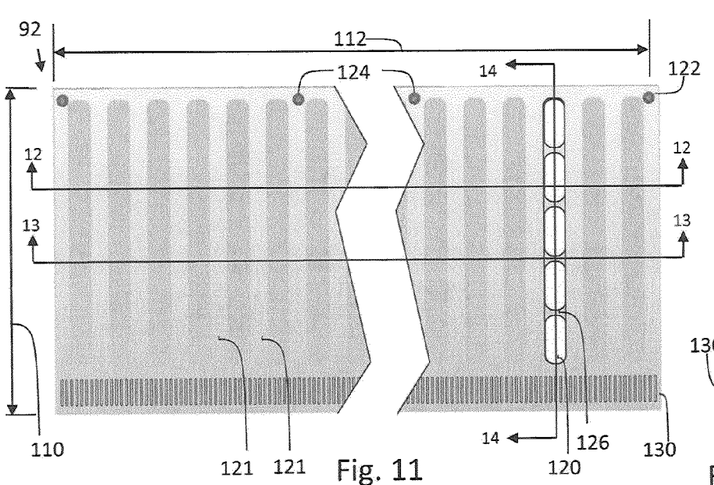
FIG. 11 is a plan view of another embodiment of a sheet for a platen segment comprising stacked laminations with slots etched through each of the laminations having epoxy thereover and forming motor teeth, and encoder teeth comprising partially etched pockets in the top lamination synchronized with the motor teeth, where the motor teeth have a greater pitch that than shown in the sheet of FIG. 1.
Figure 12:
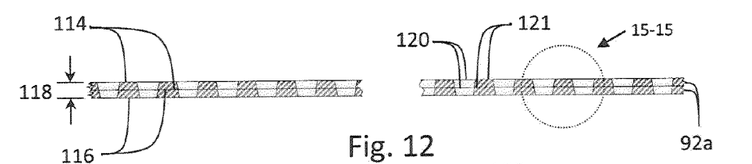
FIG. 12 is a cross sectional view of the sheet taken along lines 12-12 of FIG. 11.
Figure 13:
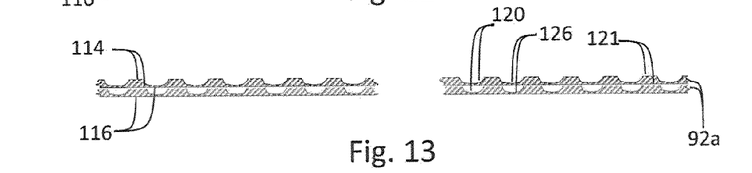
FIG. 13 is a cross sectional view of the sheet taken along lines 13-13 of FIG. 11.
Figure 14:
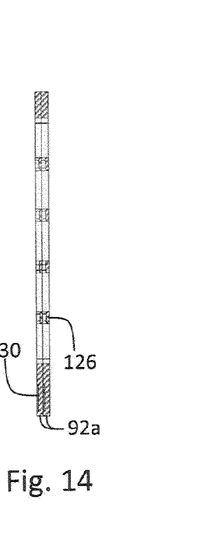
FIG. 14 is a cross sectional view of the sheet taken along lines 14-14 of FIG. 11.

As shown in the drawings, a first plurality of pockets 130 is formed in a line adjacent the motor teeth. These pockets may comprise an encoder scale for the motor. Tying the spacing of the motor teeth to the encoder locks or synchronizes the motor pitch to the encoder pitch. Preferably, the encoder pitch is an integer multiple of the motor pitch. This allows for accurate sinusoidal motor commutation, as explained below, which inherently maintains optimum commutation during the course of motor travel across the secondary. As an example, as shown in FIGS. 1 and 26, the sheet has motor teeth arranged with a 5 mm or 10 mm pitch and pockets for providing an encoder scale arranged with a 1 mm pitch.

The encoder system which includes the read head 74 and teeth 130 may comprise an incremental linear encoder that generates a transistor-transistor logic ("TTL") output signal in the form of a series of pulses relative to the amount of movement. The incremental linear encoder read head 74 reads the series of teeth 130 on the sheet and creates a series of pulses which the drive interprets as fixed increments of distance. The encoder is typically an inductive or capacitive encoder and may also provide output in the form of sine/cosine information. The encoder system may comprise an incremental encoder with reference pulses and magnetic sensors.

Preferably, the pockets 130 forming the encoder scale are etched relatively near to the motor secondary teeth. The pocket width and overall pocket pitch are preferably made to match the encoder being used. The encoder pole pitch will typically be about ½ mm to 3 mm, though the pitch may vary as required in an application to provide the needed speed for the motor, resolution, or encoder air gap. The typical resolutions of the encoder ranges from ¼ micron to 1 micron. The pocket depth for each of the encoder teeth may be approximately 0.25 mm. This depth has been found satisfactory as it allows for implementation of the "partial" photo-chemical etching processes that will create accurate features without degradation. An encoder scale formed in this manner is resistant to mechanical damage and the magnetic fields from the motor and from the magnets in the secondary, and impervious to dirt, oil, and other environmental contaminates.

Commutation Track

In addition to, or in the alternative, a plurality of pockets or recesses 140 on the sheet may also form a sensor operatively connected to the drive of the motor to facilitate commutation of the motor. For instance, the pockets forming the sensor for the commutation function of the drive may be formed in a distinct track(s) in the top surface of the sheet adjacent to or alongside the pockets forming the sensor for the encoder. The sensor may read the teeth in the track and control commutation of the motor. Thus, the commutation functionality may be provided without using Hall Effect sensors or performing a "phase search." Preferably, the pockets used for the commutation function form teeth having a width equivalent to the width of the teeth of the encoder track. As shown in the drawings, the encoder track 130 and a commutation track 140 are in close proximity to each other. Generally speaking, the spacing of pockets or teeth 140 used for the sensor for commutation is the same as the motor teeth 121, i.e. the same pitch. The pitch of the teeth of the commutation track is preferably at least the same as the teeth of the motor secondary but could be less. Additionally, the pitch of the teeth 130 of the encoder scale are an integer multiple of the pitch of the teeth 121 of the motor secondary pitch. Thus, each motor tooth will align with an encoder tooth and a commutation track tooth in a repeating pattern all along the length of the sheet of the platen segment. For ease of discussion, the tooth in the commutation track that aligns with the motor tooth will be referred to herein as a "primary commutation" tooth or pulse 142. The commutation track may be formed with an addition tooth between the primary commutation teeth. For ease of discussion, the additional tooth will be referred to herein as a "secondary commutation" teeth or pulses 144. The commutation track may be formed with additional teeth adjacent the primary commutation teeth. For ease of discussion, these will be referred to herein as "marker" teeth or pulses 146.

The commutation pulses 142,144, which may include primary pulses only, or primary and secondary pulses, depending upon the application, allow the motor to move only to the next commutation pocket or position to establish motor commutation. Because the commutation pulses 142,144 are synchronized with the motor secondary teeth 121, the motor drive is able to locate a commutation pulse in a distance less than or equal to the motor tooth pitch, thereby enabling the motor drive to determine motor phasing. Because the commutation pulse is aligned with the motor tooth, the drive may readily determine its relative location. Because both teeth are precisely formed, for instance, through the photochemical etching processes discussed above, the motor and commutation tooth are precisely aligned, and quick and precise commutation occurs without variations. This eliminates the need of Hall Effect sensors when used on linear synchronous motors with magnets in the secondary, or the need of "phase searching" to establish commutation for other linear synchronous motors that do not have magnets in the platen but have teeth instead.

Hall Effect sensors increase motor costs, for instance, additional cabling and sensors, and increase operational requirements, for instance, run time when establishing commutation. Linear drive motors with Hall Effect sensors may be difficult to align or position in the motor primary, and may degrade commutation in a motor if excessive variation exists in placement of the Hall Effect sensors on the primary and their associated magnets on the secondary. Providing an encoder and commutation track that are synchronized optimally with the motor secondary teeth eliminates these drawbacks.

As an alternative to Hall Effect sensors, "phase searching" may be used but may produce unpredictable results. Phase searching may be accomplished by powering a coil and aligning the coil to a tooth or a magnet. However, this method sometimes produces poor results due to "cogging" in an "iron core" motor or any motor with a predominately iron-based primary or when a load is pulling against the motor, for instance, from a cable track or a heavy load. Particularly, in vertical applications, it is usually difficult to perform phase searching due to the gravitational loads. Providing an encoder and commutation track that are synchronized eliminates these drawbacks.

Because the commutation pulse is synchronized with the encoder track pulses which are in turn synchronized with the motor teeth, predictable and repeatable commutation is achieved. In essence, a repeating zero point is created at every motor tooth because all three essential components, namely, the motor teeth, the encoder teeth, and the commutation teeth, are realigned or set to zero at every motor pole pitch. This assures correct sinusoidal commutation alignment regardless of the distance of the relative motion between the primary and the secondary, or as discussed below in greater detail, regardless of whether the move involves traversing several sheets of platen segments. In other words, after commutation is established, the drive need only apply the motor electrical or commutation angle offset through the encoder track to any platen secondary. Because the encoder track teeth, motor teeth, and commutation track teeth are synchronized, variation is eliminated, particularly in motors with smaller tooth pitches having relatively lengthy travel-distance requirements.

When dimensional variation of the features of the sheets forming the platen segments is significantly reduced through the manufacturing process, for instance, the photo-chemical etching processes disclosed, a primary may be replaced with another similar primary and/or a secondary may be replaced with another similar secondary. This reduces issues often associated with a relatively lengthy secondary of a sinusoidal commutated motor where manufacturing variations associated with the locations of teeth or magnets stacks up and causes an error to accumulate with respect to the expected phase positions in the drive that are tied to the encoder scale, and the actual phase positions in the secondary. The effect of this error is multiplied with motors having reduced motor pitch as the drive applies phase currents at less than precise positions or in a less-than-optimum manner. Because the encoder and motor secondary teeth are linked in an accurate and repeating pattern, the drive is less likely to lose commutation, and there is less variation during long distances of travel or with locations associated with small pitch motors. Furthermore, secondaries may be moved and interchanged indiscriminately between any number of fixed primaries as disclosed below without having to slow down or stop to "establish commutation." There are at least two aspects disclosed here: (i) sinusoidal commutation varies little if at all in any condition, and (ii) once a primary has "established" commutation in a platen in plurality of like platens, it does not need to "re-establish" commutation in another platen.

Figures 21, 22, 24:
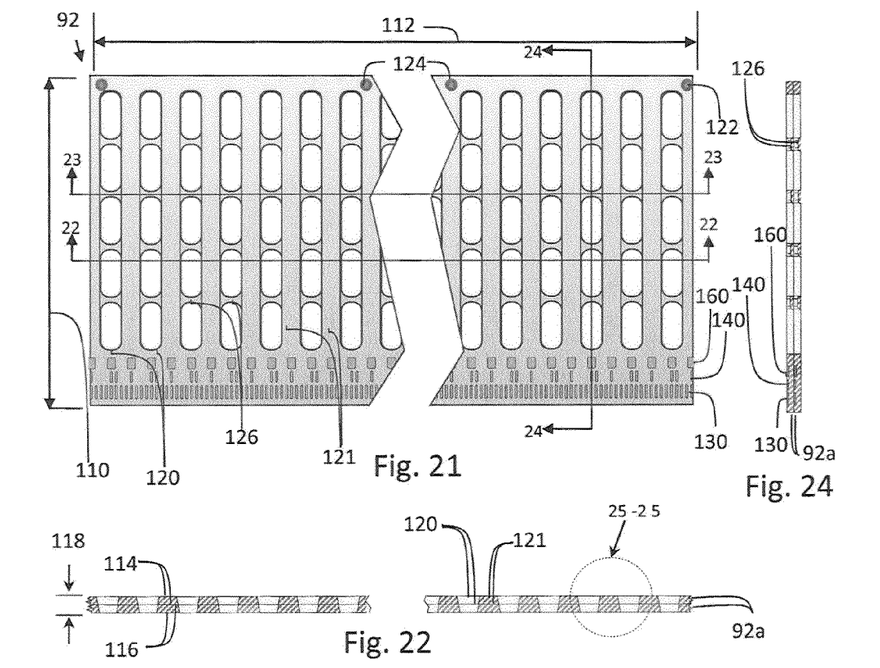
FIG. 21 is a plan view of another embodiment of a sheet for a platen segment comprising stacked laminations with motor teeth etched through each of the laminations, with encoder teeth comprising partially etched pockets in the top lamination synchronized with the motor teeth, commutation teeth comprising partially etched pockets in the top lamination synchronized with the motor teeth and including additional reference markers in the commutation track, and magnet locators comprising partially etched pockets for locators for small magnets in the top lamination synchronized with the motor and commutation teeth.
FIG. 22 is a cross sectional view of the sheet taken along lines 22-22 of FIG. 21.
FIG. 24 is a cross sectional view of the sheet taken along lines 24-24 of FIG. 21.
Figure 23:
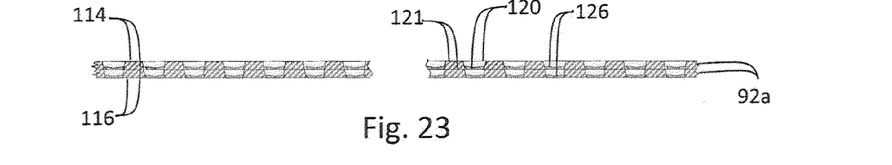
FIG. 23 is a cross sectional view of the sheet taken along lines 23-23 of FIG. 21.

In the exemplary sheets shown in FIGS. 6-10, 16-20, and 21-26, the motor moves at most 5 mm and receives a commutation pulse with the motor commutation and electrical or commutation angle offset stored in the drive. In the sheets of FIGS. 21 and 26, the primary commutation pulses 142 correspond to the first tooth in a grouping or series of marker pulses 146 (either 2 to 4 teeth which are shown in the drawing with "II," "III," or "IIII"), and the secondary commutation pulse is alone (i.e., not in a group or series), and is read by the drive as a commutation pulse. In sheet of FIGS. 21 and 26, the additional secondary commutation pulses 144 allow the drive to read a commutation pulse within movement of the motor primary of only 5 mm rather than the 10 mm distance between primary commutation pulses. As explained below in greater detail, the primary and secondary commutation pulses 142, 144 may also be used to identify position on the sheet comprising the platen and information about the sheet. A primary and secondary commutation pulse is not required on platens having a relative short length to read a pulse. The sheets of FIGS. 6-10 and 16-20 do not show secondary commutation pulses.

In a different application involving cog-free, iron core or permanent magnet motors, the teeth of the commutation track 140 may be aligned with magnet slots/pockets 148 of the secondary (rather than aligning the teeth of the commutation track with slots or pockets defining the motor teeth as described above) (FIG. 27). In addition, the magnet slots/pockets 148 may be aligned with a primary commutation tooth 142 and a secondary commutation tooth 144 may be added between adjacent primary commutation teeth to establish commutation in a distance corresponding to half of a pole pitch (FIG. 27). On motors with magnets in the secondary, as shown in FIG. 27, a pole pitch is made up of two magnets. In FIG. 27, the pole pitch is 50 mm and 5 distinct pulses 146 between the poles are added to allow phase searching to be accomplished within a fifth of the pole pitch or 10 mm. Thus, the required distance of movement for commutation is 10 mm. Additional pulses may be added as needed as pole pitch increases and/or to minimize the distance the motor primary needs to move to read a commutation pulse. In a cog-free motor application as shown in FIG. 27, the magnets may extend through the slots 148 in the sheet, or be disposed in pockets in the sheet.

Track 3

In addition to the encoder track and/or the commutation track, the top surface of the sheet may have additional tracks 150. As will be described in additional detail below, another plurality of pockets formed on the top surface of the sheet may be used to form a sensor operatively connected to the drive of the motor for position functionality associated with the motor. As described hereinafter, "Track 3" maybe used to provide this functionality. The plurality of pockets 150 forming Track 3 may be formed as teeth at a similar depth as the commutation and encoder tracks, and used to form a sensor operatively connected to the drive of the motor for providing "absolute position" information about a sheet or platen segment. As discussed below, when Track 3 is synchronized with Track 4 and a plurality of like sheets of the platens are arranged end-to-end in an elongated track, "absolute positional" information may be generated for all of the platen segments.

Track 3 may function as a flexible pseudo-absolute encoding system. The plurality of pockets or teeth 150 of Track 3 may have a pattern that is different from the other tracks but repeats at a different interval, for instance, using the example above shown in FIG. 26, every 10 mm along with the pattern in the commutation track. The sensor(s) associated with the drive may be configured or enabled to interpret the pulses generated by the teeth of the commutation track and the teeth of Track 3 as a "packet" of information that provides absolute positioning information within single sheet. For purposes of illustration and not in any limiting sense, the pulses generated by the teeth 140 of the commutation track may be referred to as "index pulses." The drive system may be configured to look at the index pulses from the commutation track and determine the location on the sheet of the platen. For instance, as shown in FIG. 26, 10 bits of unique information may be collected in a "packet" between the commutation and the encoder tracks since there are 10 pulses in Track 3 between the "primary commutation pulses", and from that absolute position may be established. The packet of information may correlate to a value found in the look-up table or the value, or be determined from a look-up table or other algorithm tied to a distinct commutation pulse correlated to that packet of information.

In the example shown in FIG. 26, the teeth 150 of Track 3 correlate with the teeth 140 of the commutation track and the encoder teeth 130, where there is a 5 mm motor tooth pitch, a 5 mm commutation tooth pitch, and a 1 mm encoder scale pitch. The 10 mm repeating sub-segments in the commutation track are defined by the first pocket or the "primary commutation pulse." In the drawings, the primary commutation pulse always has another index pulse (i.e., marker tooth or teeth 146) associated with it. There may be 1, 2, or 3 teeth next to the primary commutation pulse to provide the index pulse. This creates a larger repeating pattern in Track 3 and enables creating more pulses for development of a large skew or a 10 bit digital word.

In this way, the number of marker teeth 146 next to the primary commutation pulse 142 may be used to identify a location within a single sheet. For instance, one pocket next to the primary commutation pulse segment indicates the position is in the first third of the sheet. Two pockets next to the primary commutation pulse indicate a position in the middle third of the sheet. Three pockets next to the primary commutation pulse indicate a position in the last third of the sheet. The use of marker teeth or pulse after the primary commutation pulse adds a multiplying factor of three to the "packet" of information collected by the sensors associated with the Track 3. This also reduces the distance the motor primary moves to find absolute position when many sheets are strung together. As discussed above, the commutation pulse between the primary commutation pulses is the secondary commutation pulse. Unlike the primary commutation pulses, the secondary commutation pulse 144 preferably does not have a marker pulse associated with it. Thus, the secondary commutation pulse 144 is easy to identify in the commutation track and is used for commutation only, and not for identifying the repeating pattern in Track 3. The secondary commutation pulse may be eliminated if moving the motor primary a greater distance to establish commutation is not an issue in the application.

The 10 bits of information found in Track 3 allows for encoding of a sheet of a platen segment. As an example, a sheet forming a platen segment having a length of 2500 mm would be sub-divided every 10 mm into 250 sub-segments each with its own reference encoding in the manner described above. Thus, the motor may find absolute position by moving no more than two primary commutation pulses. Using the example describe above, the motor may move less than 5 mm to read the presence of a commutation pulse in Track 2. For instance, if the drive reads a primary commutation pulse, the drive will first establish commutation and continue to move until it reads at most 10 bits of information in Track 3, thereby enabling the drive to identify its exact location on the sheet. If the drive reads a secondary commutation pulse first, the drive will establish commutation, advance to the primary commutation pulse, and then read the 10 bits of information in Track 3, thereby enabling the drive to identify its exact location on the sheet. Because the information in Track 3 is synchronized or tied to the commutation pulses of Track 2, the drive is able to distinguish between and precisely locate positions for 250 or more unique "home" locations in a single platen segment. These "index pulses" establish quick and accurate motor commutation and absolute position within a platen segment. Because the commutation pulses in fact function as homing or index pulses within the encoder, the motor's position is very accurate and repeatable to 1 encoder count. Therefore, the information from Track 3 applied to a commutation pulse will be accurate and repeatable to 1 encoder count.

Only 7 bits of the 10 bits of information in Track 3 are needed to give absolute position in a 2500 mm long sheet. Utilizing all 10 bits would allow encoding a 30,720 mm platen. Thus, a flexible pseudo-absolute encoding system may be used for: (i) minimizing search distance to establish absolute position; and/or (ii) maximizing the possible platen length through a plurality of segments. For example, in a motor having a fixed primary and moving secondaries having a length of approximately 24 inches (610 mm), a 5 mm pitch motor without secondary commutation pulses is able to find commutation and absolute position in only 5 mm of travel. The platen may be divided into 4 zones by adding 1, 2 or 3 pulses after the primary commutation pulses in the commutation track (Track 2) (see FIG. 26). Track 3 of such a motor may have 5 bits of information and with the 5 mm motor pitch, the motor may be provided with 640 mm of encoding.

A skew may also be incorporated into Track 3 to provide an alternate means of determining absolute position on a sheet of the platen. Accordingly, the "packet" is not 10 bits of information but a skew. There may be a unique skew between each primary commutation pulse or "home" index pulse. Depending upon the application, adding 1, 2, or 3 pockets after the primary commutation pulse, as described above, may not be necessary. One pocket after the primary commutation pulse may be used to establish position markers in the sheet as shown in FIGS. 21 and 27. Alternately, the secondary pulse may be eliminated if a longer distance to establish commutation is acceptable in the application. This may be useful to minimize the programming in the drive.

Track 4

In addition to the encoder track and/or the commutation track and/or Track 3, the top surface of the sheet may have additional tracks. As will be described in additional detail below, another plurality of pockets formed on the top surface of the sheet may be used to form a flexibly programmed sensor operatively connected to the drive of the motor. The teeth may be formed in a track. As described hereinafter, "Track 4" 160 maybe used to provide "homes" and/or positional limit information, and/or platen segments identification.

Magnetic material may be added later into the pockets 160 of Track 4 to form the sensor for setting positional limits. These additional pockets may be etched alongside or adjacent to the encoder scale to a depth that makes the magnets approximately flush to the encoder scale or as needed to be optimally read by the encoder head. Index pulses from the commutation track, may be used in connection with the magnetic signals from the positional limits to provide precise and accurate positional limits for the motor. In general, a magnetic limit may not be very accurate or repeatable because of inherent hysteresis. However, the effects from hysteresis may be eliminated when the magnet positional limit is used in connection with index pulses from one or both of the commutation track and/or encoder track. For instance, a pocket forming a sensor for a positional limit may comprise a "south" magnet, and when the drive receives the signal generated by the "south" magnet, it will assign a position to the motor primary to that of the nearest commutation index pulse read by the encoder, thereby establishing an accurate to "home" for the primary. Accordingly, the commutation pulse is in essence a "home" index pulse. Thus, the combination of the magnet and the index pulse provides an accurate and repeatable "latch" for homing which is accurate and repeatable to 1 encoder count. Also, a "north" magnet may be added to Track 4. The drive may be configured to read the "north" magnet as a limit, as needed by the application. If a home is not needed, for instance, when the scale is configured as a pseudo absolute encoder for a single secondary, as stated above, the "north" and "south" magnets can be simply read as left and right limits.

Alternately, the pockets with magnets or other markers in Track 4 may also be used to identify a platen among many platens. Because the drive may determine the absolute position information for the platen segment from the information from Track 3, the drive may determine where every magnet pocket is located with respect to every primary commutation pulse and be configured to determine the patterns of the magnets to determine a platen segment's identity. Number codes may be etched into the platen segment to assist in identifying a platen segment from among many. This allows for flexible programming. As shown above, the information contained in Tracks 2 and 3 establish both commutation and absolute position within a single platen segment. A pattern of magnets at the beginning of a platen segment in Track 4 may also be used to identify platens. For instance, "north" magnets may be used to identify a platen, thereby allowing "south" magnets to be used as limits. As an alternative, "north" and "south" magnets may be used to identify platen segments. As yet another alternative, where more platens are seamed together, a skew may be used in placement of magnets. By way of example, Track 4 may be formed with 200 to 500 magnet pockets in one 2500 mm platen segment, and by placing a magnet in a different pocket among the 200 to 500 available magnet pockets in Track 4 of the platen, one magnet could be used to identify some 200 to 500 platen segments. By using "north" and/or "south" magnets, 400 to 1000 platen segments may be identified. If more platens need to be identified multiple magnets may be used. Magnets may also be added between every primary commutation pulse to reduce the length of travel during identification of a platen from the length of the platen segment to only 10 mm in the examples described above. Magnets may be placed in a repeating pattern in any multiple of the repeating 10 mm pattern between primary commutation pulses. Additionally, different combinations of "north" and "south" magnets may be used to identify the platens. The information within a pattern may be read as a skew or as a digital word. The word could be in a "binary" format with two conditions reading a "north" or "south" magnet providing a "bit" of information. The word could also be in a base 3 format so within a single pocket in Track 4, there can be three conditions, for instance, a north magnet is read as "+1", no magnet in a pocket is read as "0" and a south magnet as "−1". Accordingly, the drive may be configured to read the "packets' of information from the magnets in Track 4, and access a look-up table to identify the platen segment. Providing Track 4 in a digital word format may be preferred when configuring platen segments as moving secondaries to be passed between fixed primaries. In such an arrangement, the drive may be configured to read the first 10 pockets, which may include magnets or spaces, and from information identify the platen. In a base-2 system, 1024 platen segments may be identified; in a base-3 system, 59049 platen segments may be identified.

Using the principles described herein, the drive of the motor may be configured to operate in an "open loop" mode until it reads any commutation pulse in Track 2 whereupon commutation is established, and thereafter, the drive may be configured to operate in a "closed loop" or "servo mode". Elaborating on the example provided previously, the drive may also be configured such that when it reads a primary commutation pulse 142, it establishes commutation, and determines absolute position in the platen segment based upon the combination of the primary commutation pulse of Track 2 and the 10 bits of information read from Track 3 between primary commutation pulses. The drive may also be configured such that when it reads a secondary commutation pulse 144 before the primary commutation pulse, the drive establishes commutation at the secondary commutation pulse, advances to the next primary pulse, and determines absolute position in the platen segment based upon the combination of the primary commutation pulse of Track 2 and the 10 bits of information read from Track 3. The drive may then be configured to move the motor in such a way that the drive reads the information of Track 4 and then determines platen identity, for instance, by grouping the Track 4 information into the appropriate packets defined by the repeating pattern of markers on Track 4, and/or by comparing the information with an algorithm or look-up table. In other words, the drive is configured to determine absolute position on a single platen based upon the combination of commutation pulses of Track 2 and the information of Track 3. Once absolute position on a single platen is determined, the drive may be enabled to read information encoded in Track 4, for instance, read and interpret any combination of magnets and/or spaces present in Track 4. Thus, through the combination of commutation pulses of Track 2, positional information from Track 3, and the arrangement of markers in Track 4, determine platen identity, home positions or limits. Accordingly, the positional or identification information developed from the combination of the commutation pulses of Track 2 and the information of Track 3 and/or Track 4 will be accurate and repeatable to 1 encoder count.

The description above utilizes a sensor comprising magnets installed in the pocket. However, the sensor may use labels read with an optical scanner. The pockets 160 may be etched with the label or in a manner to locate the label instead of the magnets as described above. For example, the instructions may provide programming for the drive to move the motor through a sequence of moves. In this way the platen may be used in CNC machining center, and the instructions encoded in Track 4, may enable the system to move the platen to a position for a machining operation (i.e., "go to a point and wait for a hole to be drilled") and then advance to the next step. Another application may involve a conveyor line used to feed, position, sort, and/or transfer randomly "moving secondaries" in a non-sequential manner from a fixed primary to a conveyor and then to another fixed primary capable of rotation to allow transfer of the secondary to other conveyor lines. Because the electrical or commutation angle offset may be set for specific motors, there is interchangeability between primaries, secondaries and drives for a given motor, and the ability to pass identical secondaries from one primary to another. The systems and methods described herein may also be used in systems in a warehouse or factory with lengthy runs of conveyor or rail system. In one example, a warehouse may use several sheets forming platen segments that are installed in a floor of the warehouse. Also, multiple "robots" may be used on the different sheets of the platen segments, the positional limits and "home" of each sheet may be established so that the robots do not interfere with each other.

A linear stage as described herein is highly integrated and merges (i) key motor secondary components, such as motor teeth, encoder teeth, commutation tracks, absolute position tracks, limits and home positions; (ii) a bearing rail system; and (iii) key motor primary components, such as motor teeth, coils, encoder; all in close proximity to each other and in many cases in a functional interrelationship.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A secondary for a motor comprising:
a sheet of magnetic permeable material, the sheet having a width and a length, and a first surface and an opposite second surface with a thickness extending therebetween, the sheet having a plurality of slots in the first and second surfaces and at least partially extending through the sheet thickness parallel to the width of the sheet and spaced along a length of the sheet, the slots defining a plurality of teeth in the sheet between the slots and enabling the sheet to be conformable to a mounting surface to which the sheet is mounted when forming the secondary of the motor, the plurality of teeth having a motor pitch, the first surface having a plurality of pockets formed adjacent the plurality of slots, the pockets extending parallel to the width and being spaced along the length of the sheet, the pockets forming a sensor operatively connected to a control of the motor.

2. The secondary of claim 1, wherein the secondary is a platen of a linear drive motor.

3. The secondary of claim 1, wherein the secondary is flat.

4. The secondary of claim 1, wherein the sheet has a plurality of bridges formed in the slots between the teeth thereby operatively connecting the teeth together.

5. The secondary of claim 4, wherein the bridges form recesses in at least one of the first and second surfaces.

6. The secondary of claim 1, wherein the sheet includes laminations stacked together to form the sheet.

7. The secondary of claim 6, wherein the laminations are selectively stacked to form a desired cross sectional geometry of the teeth of the sheet.

8. The secondary of claim 6, wherein a width of the slots on the first side of the sheet are wider than a width of the slots on the second side of the sheet opposite the first side.

9. The secondary of claim 6, wherein a width of the teeth on the first side of the sheet are narrower than a width of the teeth on the second side of the sheet opposite the first side.

10. The secondary of claim 1, wherein the secondary comprises a support plate with a pocket that receives the sheet.

11. The secondary of claim 1, wherein at least a portion of the plurality of pockets forming the sensor operatively connected to the control of the motor comprises an encoder for the motor.

12. The secondary of claim 11, wherein the at least portion of the plurality of pockets has an encoder pitch.

13. The secondary of claim 12, wherein the motor pitch is an integer multiple of the encoder pitch.

14. The secondary of claim 1, wherein at least a portion of the plurality of pockets forming the sensor operatively connected to the control of the motor controls commutation of the motor.

15. A linear drive motor having the secondary of claim 1.

16. A secondary for a motor comprising:
a sheet of magnetic permeable material, the sheet having a width and a length, and a first surface and an opposite second surface with a thickness extending therebetween, the sheet having a plurality of slots in the first and second surfaces and at least partially extending through the sheet thickness parallel to the width of the sheet and spaced along a length of the sheet, the slots defining a plurality of teeth in the sheet between the slots and enabling the sheet to be conformable to a mounting surface to which the sheet is mounted when forming the secondary of the motor, the plurality of teeth having a motor pitch, the first surface having a first set of pockets formed adjacent the plurality of slots, the first set of pockets extending parallel to the width and being spaced along the length of the sheet, the first set of pockets forming an encoder for the motor, the first set of pockets having an encoder pitch, the motor pitch being an integer multiple of the encoder pitch, the first surface having a second set of pockets formed adjacent the slots, the second set of pockets extending parallel to the width and being spaced along the length of the sheet, the second set of pockets forming a sensor operatively connected to a control controlling commutation of the motor.

17. The secondary of claim 16, wherein the second set of pockets has a spacing corresponding directly to the motor pitch.

18. The secondary of claim 16, wherein the first set of pockets forms a first track on the first surface of the sheet and the second set of pockets forms a second track adjacent the first track on the first surface of the sheet.

19. The secondary of claim 16, further comprising a third set of pockets formed on the first surface of the sheet forming a sensor operatively connected to the control of the motor configured to provide positional information relative to the sheet when read by the sensor.

20. The secondary of claim 16, further comprising a third set of pockets formed on the first surface of the sheet forming a sensor operatively connected to the control of the motor configured to provide information about the secondary.

21. The secondary of claim 16, further comprising a third set of pockets formed on the first surface of the sheet forming a sensor operatively connected to the control of the motor configured to provide positional limits of motion for the motor.

22. A linear drive motor with a secondary as described in claim 21.

23. A linear drive motor with a plurality of sheets as described in claim 21 arranged end to end along their lengths to form the secondary for the linear drive motor.

24. The linear drive motor of claim 23, further comprising a fourth set of pockets formed on the first surface of the sheet forming a sensor operatively connected to the control of the motor providing information about each sheet in of the secondary.

25. A secondary for a motor comprising:
a sheet of magnetic permeable material, the sheet having a width and a length, and a first surface and an opposite second surface with a thickness extending therebetween, the sheet having a plurality of slots in the first and second surfaces and at least partially extending through the sheet thickness parallel to the width of the sheet and spaced along a length of the sheet, the slots defining a plurality of teeth in the sheet between the slots and enabling the sheet to be conformable to a mounting surface to which the sheet is mounted when forming the secondary of the motor, the plurality of teeth having a motor pitch, the first surface having a first set of pockets formed adjacent the plurality of slots, the first set of pockets extending parallel to the width and being spaced along the length of the sheet, the first set of pockets being adapted to be read by an encoder for the motor, the first set of pockets having an encoder pitch, the motor pitch being an integer multiple of the encoder pitch, the first surface having a second set of pockets formed adjacent the first set of pockets, the second set of pockets extending parallel to the width and being spaced along the length of the sheet, the second set of pockets being adapted to be read by a sensor of the motor operatively connected to a control of the motor controlling commutation of the motor.

26. The secondary of claim 25, wherein at least one of the first and second set of pockets are configured to be used by the control of the motor to identify a position relative to the sheet.

27. The secondary of claim 26, wherein the first and second set of pockets are synchronized with the teeth formed in the sheet.

28. The secondary of claim 27, further comprising a third set of pockets formed on the first surface of the sheet, the third set of pockets being adjacent the second set of pockets and extending parallel to the width and being spaced along the length of the sheet, the third set of pockets being adapted to be read by a sensor operatively connected to the control of the motor for providing absolute positioning information relative to the sheet.

29. The secondary of claim 28, wherein the third set of pockets are synchronized with the positions of the first and second sets of teeth.

30. The secondary of claim 28, further comprising a skew associated with the third set of pockets.

31. The secondary of claim 28, wherein the third set of pockets have a repeating pattern along the length of the sheet.

32. The secondary of claim 31, wherein the second set of pockets define an interval of the repeating pattern of the third set of pockets.

33. The secondary of claim 32, wherein the information from the repeating pattern of the third set of pockets relates to position on the sheet.

34. The secondary of claim 28, further comprising a fourth set of pockets formed on the first surface of the sheet, the fourth set of pockets being synchronized with at least one of the first and second sets of pockets.

35. The secondary of claim 34, wherein the fourth set of pockets forms a sensor operatively connected to the control of the motor configured to set positional limits of motion of the motor.

36. The secondary of claim 35, wherein the fourth set of pockets forms a sensor operatively connected to the control of the motor configured to set positional limits of motion of the motor.

37. A linear drive motor with a secondary as described in claim 25.

* * * * *